US009125125B2

(12) United States Patent
Jung et al.

(10) Patent No.: US 9,125,125 B2
(45) Date of Patent: Sep. 1, 2015

(54) METHOD FOR PERFORMING HANDOVER IN BROADBAND WIRELESS ACCESS SYSTEM

(75) Inventors: Inuk Jung, Anyang-si (KR); Jin Lee, Anyang-si (KR); Giwon Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 13/700,416

(22) PCT Filed: May 27, 2011

(86) PCT No.: PCT/KR2011/003916
§ 371 (c)(1),
(2), (4) Date: Nov. 27, 2012

(87) PCT Pub. No.: WO2011/149309
PCT Pub. Date: Dec. 1, 2011

(65) Prior Publication Data
US 2013/0072196 A1 Mar. 21, 2013

Related U.S. Application Data

(60) Provisional application No. 61/348,742, filed on May 27, 2010.

(30) Foreign Application Priority Data

May 25, 2011 (KR) .......................... 10-2011-0049475

(51) Int. Cl.
*H04W 36/00* (2009.01)
*H04W 36/30* (2009.01)
(Continued)

(52) U.S. Cl.
CPC .............. *H04W 36/30* (2013.01); *H04W 36/16* (2013.01); *H04W 36/24* (2013.01); *H04W 36/0083* (2013.01); *H04W 36/04* (2013.01); *H04W 84/045* (2013.01)

(58) Field of Classification Search
CPC ..... H04W 36/30; H04W 36/04; H04W 36/16; H04W 36/24; H04W 36/0083

USPC .......................................... 455/436, 442, 439
See application file for complete search history.

(56) References Cited

U.S. PATENT DOCUMENTS

2009/0268661 A1* 10/2009 Ng et al. ........................ 370/328
2009/0291686 A1* 11/2009 Alpert et al. .................. 455/436
(Continued)

FOREIGN PATENT DOCUMENTS

KR    10-2007-0095093    9/2007
KR    10-2008-0051064    6/2008
(Continued)

OTHER PUBLICATIONS

PCT International Application No. PCT/KR2011/003916, Written Opinion of the International Searching Authority dated Dec. 23, 2011, 17 pages.

(Continued)

*Primary Examiner* — Vladimir Magloire
(74) *Attorney, Agent, or Firm* — Lee, Hong, Degerman, Kang & Waimey

(57) ABSTRACT

The present invention relates to a broadband wireless access system, and more specifically aims to define an efficient handover (HO) procedure when a base station having a relatively narrow coverage, such as femto base station, and a macro base station are both present. A method for performing a handover by a mobile station (MS) in a broadband wireless access system according to one embodiment of the present invention comprises the steps of: determining the type of a target base station that satisfies the pre-set handover trigger conditions; starting the handover procedure for the target base station when the target base station is a first type base station according to the determined results, and starting a first timer when the target base station is a second type base station having narrower coverage than the first type base station according to the determined results; and determining whether communication with the target base station is possible after the first timer has been completed, if the first timer had been started.

16 Claims, 6 Drawing Sheets

(51) Int. Cl.
*H04W 36/24* (2009.01)
*H04W 36/16* (2009.01)
*H04W 36/04* (2009.01)
*H04W 84/04* (2009.01)

(56) References Cited

U.S. PATENT DOCUMENTS

2010/0246538 A1* 9/2010 Kravtsov et al. ............... 370/336
2011/0201339 A1* 8/2011 Kuningas ...................... 455/436

FOREIGN PATENT DOCUMENTS

| KR | 10-2009-0124788 | 12/2009 |
| KR | 10-2010-0050546 | 5/2010 |
| KR | 10-2010-0055171 | 5/2010 |
| WO | 2009/007720 | 1/2009 |
| WO | 2010/017212 | 2/2010 |

OTHER PUBLICATIONS

Korean Intellectual Property Office Application Serial No. 10-2011-0049475, Notice of Allowance dated Jan. 8, 2013, 2 pages.

* cited by examiner

METHOD FOR PERFORMING HANDOVER IN BROADBAND WIRELESS ACCESS SYSTEM

CROSS-REFERENCE TO RELATED APPLICATIONS

This application is the National Stage filing under 35 U.S.C. 371 of International Application No. PCT/KR2011/003916, filed on May 27, 2011, which claims the benefit of earlier filing date and right of priority to Korean Patent Application No. 10-2011-0049475, filed on May 25, 2011, and also claims the benefit of U.S. Provisional Application Ser. No. 61/348,742, filed on May 27, 2010, the contents of which are all hereby incorporated by reference herein in their entirety.

TECHNICAL FIELD

The present invention relates to a broadband wireless access system and more particularly defines an efficient handover procedure in an environment in which a base station having a relatively small coverage such as a femto base station and a macro base station are present together.

BACKGROUND ART

Handover (HO) is a procedure in which a mobile station (MS) moves from an air interface of one base station to an air interface of another base station. A handover procedure of a general IEEE 802.16e system is described below.

In an IEEE 802.16 network, a serving base station (SBS) may broadcast neighbor base station information through a neighbor advertisement (MOB_NBR-ADV) message in order to inform a mobile station (MS) of basic network configuration information (topology).

The MOB_NBR-ADV message includes system information of the serving base station and neighbor base stations, for example, preamble indexes, frequencies, handover (HO) optimization possibility, downlink channel descriptor (DCD)/uplink channel descriptor (UCD) information, etc.

The DCD/UCD information includes information required for an MS to perform information exchange in downlink and uplink. For example, the DCD/UCD information includes HO trigger information, a medium access control (MAC) version of a base station, Media Independent Handover (MIH) capability information, etc.

A general MOB_NBR-ADV message includes only information associated with neighbor base stations of an IEEE 802.16e type. Information associated with base stations of the type other than an IEEE 802.16e type may be broadcast to MSs through a service identity information advertisement (SII-ADV) message. Accordingly, an MS may acquire information associated with base stations of a heterogeneous network by requesting an SBS to transmit the SII-ADV message.

A procedure for performing handover by an MS, which has acquired information associated with neighbor base stations using the above-described method, in an IEEE 802.16e network is described below in more detail with reference to FIG. 1.

FIG. 1 illustrates an exemplary handover procedure which may be performed in an IEEE 802.16e system.

As shown in FIG. 1, first, a mobile station (MS) may access a serving base station (SBS) to perform data exchange (S101).

The SBS may periodically broadcast information associated with neighbor base stations (BSs) located within the coverage of the SBS to the MS through an MOB_NBR-ADV message (S102).

The MS may begin to scan candidate HO BSs using an HO trigger condition while communicating with the SBS. The MS may transmit a handover request (MOB_MSHO-REQ) message to request the SBS to perform a handover procedure when a handover condition is satisfied, for example, when a predetermined hysteresis margin value is exceeded (S103).

The SBS may inform candidate HO BSs included in the MOB_MSHO-REQ message of the handover request received from the MS through an HO-REQ message (S104).

The candidate HO BSs may take precautions for the MS which has requested handover and transmit information associated with handover to the SBS through an HO-RSP message (S105).

The SBS may transmit the information associated with handover acquired from the candidate HO BSs through the HO-RSP message to the MS through a handover response (MOB_BSHO-RSP) message. The MOB_BSHO-RSP message may include information required to perform handover such as an action time for handover, a handover identifier (HO ID) and a dedicated HO CDMA ranging code (S106).

The MS may determine one target BS (TBS) among the candidate HO BSs based on information included in the MOB_BSHO-RSP message received from the SBS. Then, the MS may attempt to perform ranging by transmitting a CDMA code to the determined target BS (S107).

The target BS which has received the CDMA code may transmit information indicating whether or not ranging has succeeded and physical correction values to the MS through a ranging response (RNG-RSP) message (S108).

Then, the MS may transmit a ranging request (RNG-REQ) message for authentication to the target BS (S109).

The target BS which has received the ranging request message of the MS may provide system information such as a connection identifier (CID) which can be used in the BS to the MS through a ranging response message (S110).

When the target BS has successfully completed authentication of the MS and has transmitted all update information, the target BS may notify the SBS of the MS of whether or not handover has succeeded through a handover completion message (HO-CMPT) (S111).

Thereafter, the MS may exchange information with the target BS which performs handover (S112).

A handover procedure that may be performed in the IEEE 802.16m system is similar to the handover procedure of the IEEE 802.16e system described above. However, messages having different names may be defined as follows.

MOB_NBR-ADV->AAI_NBR-ADV: This message includes system information or the like that is transmitted in the form of an S-SFH rather than a DCD/UCD.

MSHO-REQ->AAI-HO-REQ

BSHO-RSP->AAI-HO-CMD

RNG-REQ (CDMA code)->Ranging preamble code

RNG-RSP (ranging status)->AAI-RNG-ACK (ranging status)

RNG-REQ (MAC message)->AAI-RNG-REQ

RNG-RSP->AAI-RNG-RSP: This message includes a TSTID or an STID which is a station ID rather than a CID.

An Advanced Mobile Station (AMS) that complies with the general handover procedure described above performs handover according to channel status or coverage of an Advanced Base Station (ABS) as the AMS moves through an overlay network. However, when the AMS moves in a region in which ABSs (for example, a femto cell, a pico cell, a relay station, or the like) whose coverage is relatively small are present in the coverage of a macro ABS, handover triggering often occurs.

Although the AMS may hand over from the macro ABS to a small ABS having high signal quality, the AMS may again perform handover due to small coverage of the target ABS. Such frequent handover is undesirable not only in terms of latency of the AMS but also in terms of resource management of the ABS since handover of the AMS requires coordination of the ABS.

Therefore, there is a need to provide a method for preventing unnecessary handover in a scanning procedure or a handover triggering procedure in a situation in which ABSs having different coverage are present together as described above.

DISCLOSURE

Technical Problem

An object of the present invention devised to solve problems of the related art described above lies in providing a method for performing more efficient handover, which can prevent unnecessary frequent handover, and an apparatus for performing the same.

Another object of the present invention is to provide a method for preventing unnecessary frequent handover in a neighbor base station scanning procedure and an apparatus for performing the same.

Another object of the present invention is to provide a method for preventing unnecessary frequent handover in a handover triggering procedure and an apparatus for performing the same.

Objects of the present invention are not limited to those described above and other objects will be clearly understood by those skilled in the art from the following description.

Technical Solution

A method for performing handover by a mobile station in a broadband wireless access system according to an embodiment of the present invention in order to achieve the above objects includes determining a type of a target base station that satisfies a preset handover triggering condition, initiating a handover procedure for handing over to the target base station upon determining that the target base station is a first type of base station and starting a first timer upon determining that the target base station is a second type of base station whose coverage is smaller than that of the first type of base station, and determining, when the first timer is started, whether or not it is possible to communicate with the target base station after the first timer expires.

Here, the method may further include initiating a handover procedure for handing over to the target base station upon determining that it is possible to communicate with the target base station after the first timer expires.

Determining whether or not it is possible to communicate with the target base station may include receiving a secondary advanced preamble (SA-preamble) of the target base station.

The first type of base station may include a macro base station and the second type of base station may include a pico-cell base station, a femto-cell base station, and a relay station.

A method for performing handover by a mobile station in a broadband wireless access system according to an embodiment of the present invention in order to achieve the above objects may include scanning a target base station, applying a weight according to a type of the target base station to a result of the scanning, and determining whether or not a handover triggering condition is satisfied using the scanning result to which the weight has been applied.

The weight according to the type may be received from a serving base station through a scan response (AAI-SCN-RSP) message.

The method may further include transmitting the scanning result to which the weight has been applied to a serving base station through a scan report (AAI-SCN-REP) message.

The type may be determined according to a size of coverage of each base station.

A method for a serving base station to support handover of a mobile station in a broadband wireless access system according to an embodiment of the present invention in order to achieve the above objects may include transmitting, to a mobile station, a scan response message including a weight which is to be applied to a result of scanning that the mobile station is to perform according to a type of a target base station, receiving a scan report message including the scanning result to which the weight has been applied from the mobile station, and determining whether or not a handover triggering condition is satisfied using the scanning result to which the weight has been applied.

Here, the type may be determined according to a size of coverage of each base station.

A mobile station that operates in a broadband wireless access system according to an embodiment of the present invention in order to achieve the above objects includes a processor, and a Radio Frequency (RF) module for externally transmitting and receiving a wireless signal under control of the processor. Here, the processor may perform control operations for determining a type of a target base station that satisfies a preset handover triggering condition, initiating a handover procedure for handing over to the target base station upon determining that the target base station is a first type of base station, starting a first timer upon determining that the target base station is a second type of base station whose coverage is smaller than that of the first type of base station, and determining, when the first timer is started, whether or not it is possible to communicate with the target base station after the first timer expires.

Here, the processor may perform a control operation for initiating a handover procedure for handing over to the target base station upon determining that it is possible to communicate with the target base station after the first timer expires.

The processor may also determine that it is possible to communicate with the target base station if a secondary advanced preamble (SA-preamble) of the target base station is successfully received.

The first type of base station may include a macro base station and the second type of base station includes a pico-cell base station, a femto-cell base station, and a relay station.

A mobile station that operates in a broadband wireless access system according to an embodiment of the present invention in order to achieve the above objects includes a processor, and a Radio Frequency (RF) module for externally transmitting and receiving a wireless signal under control of the processor. Here, the processor may perform control operations for scanning a target base station, applying a weight according to a type of the target base station to a result of the scanning, and determining whether or not a handover triggering condition is satisfied using the scanning result to which the weight has been applied.

Here, the weight according to the type may be received from a serving base station through a scan response (AAI-SCN-RSP) message and the processor performs a control operation for transmitting a scan report (AAI-SCN-REP)

message including the scanning result to which the weight has been applied to a serving base station.

The type may be determined according to a size of coverage of each base station.

Advantageous Effects

According to the embodiments of the present invention, when a mobile station moves at a high speed, the mobile station may pass by a small cell without handing over to the small cell and therefore it is possible to reduce latency and to prevent waste of wireless resources.

Particularly, it is possible to prevent base station handover triggering by giving penalty to a small cell in a neighbor base station scanning procedure.

In addition, in a handover triggering procedure, the mobile station determines using a timer whether or not it is possible to hand over to a base station even after the timer expires and therefore it is possible to prevent unnecessary frequent handover.

Advantages of the present invention are not limited to those described above and other advantages will be clearly understood by those skilled in the art from the following description.

MODE FOR INVENTION

Figure 1:
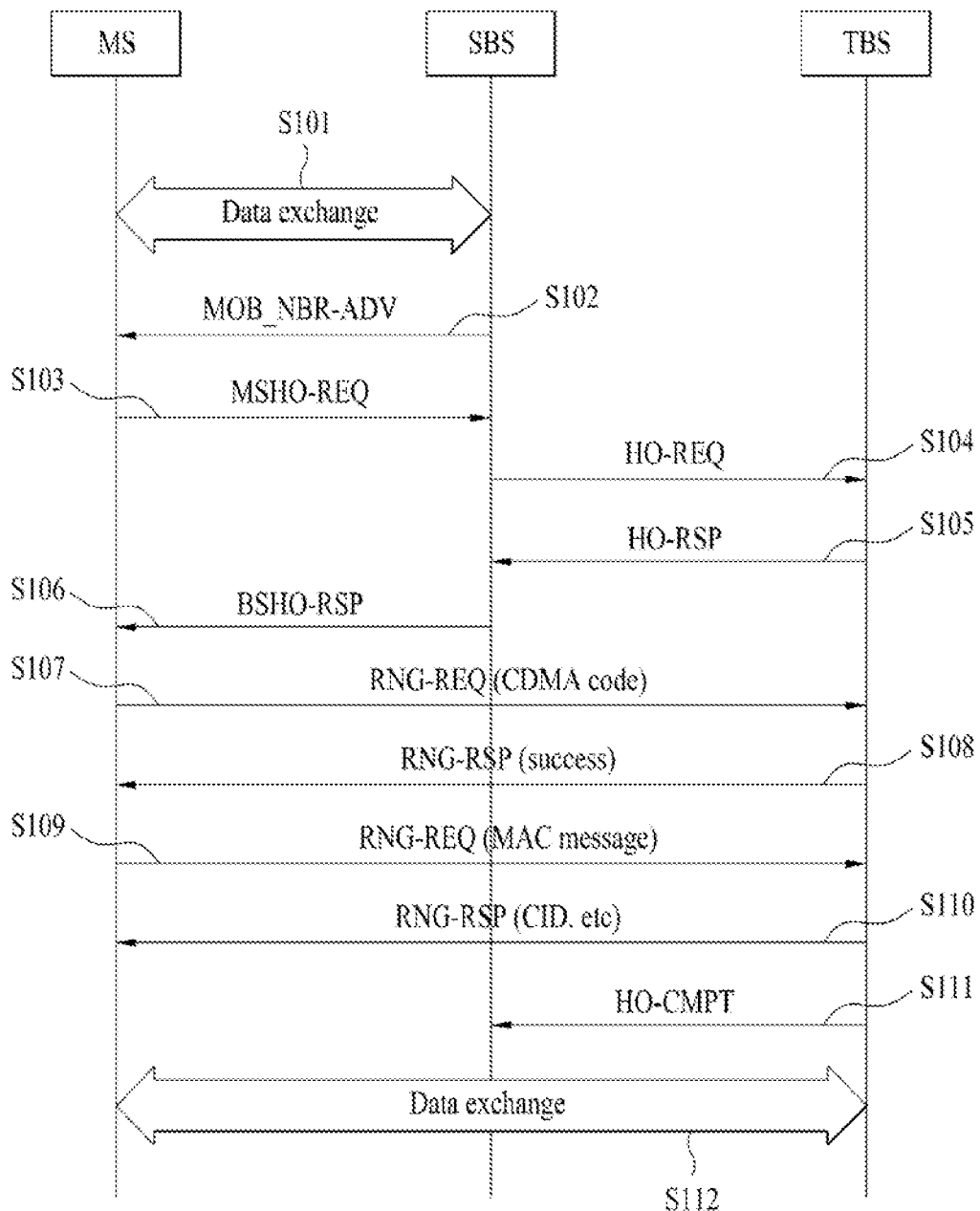
FIG. 1 illustrates an exemplary handover procedure which may be performed in an IEEE 802.16e system.

To achieve the above objects, the present invention discloses a procedure for performing more efficient handover and an apparatus for performing the same.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", "access point", or "Advanced BS (ABS)". In addition, the term "terminal" may also be replaced with another term such as "User Equipment (UE)", Mobile Station (MS)", "Mobile Subscriber Station (MSS)", "Advanced MS (AMS)", or "Subscriber Station (SS)".

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by one or more of P802.16-2004, P802.16e-2005, P802.16Rev2, and IEEE P802.16m which are standard documents of the IEEE 802.16 system.

Specific terms used in the following description are provided for better understanding of the present invention and can be replaced with other terms without departing from the spirit of the present invention.

The following is a description of a handover procedure in an IEEE 802.16m system.

In IEEE 802.16m, handover (HO) is largely classified into three procedures, HO decision and initiation, HO preparation, and HO execution. Before performing these three procedures, there is a need to perform a procedure for collecting information regarding a neighbor ABS. A scanning procedure for this is similar to a scanning procedure in a general IEEE 802.16e network. However, the AMS may scan neighbor ABSs using this when the AMS is in a section where the AMS does not communicate with a serving ABS (S-ABS).

In the HO decision and initiation procedure, the AMS or the ABS may initiate the handover procedure. When the AMS initiates handover, the AMS transmits a handover request (AAI_HO-REQ) message to the serving ABS. Here, the AMS determines whether or not to perform EBB handover according to decision of the ABS.

In the HO preparation procedure, the serving ABS (S-ABS) and a target ABS (T-ABS) exchange AMS information and negotiate about conditions on an HO execution procedure which is performed at a later time and resources which are to be allocated to the AMS such as dedicated code, an STID, and security parameters. Depending on the circumstances, the S-ABS may provide a plurality of T-ABSs to the AMS. When the ABS initiates handover, the AMS requests handover through an AAI-HO-REQ message and receives such information from the ABS through a handover command (AAI_HO-CMD) message. Here, an action time and a disconnect time are transmitted within the AAI_HO_CMD message. The term "action time" refers to the time at which the AMS performs network re-entry and the term "disconnect time" refers to the time at which the S-ABS stops allocating downlink/uplink (DL/UL) resources to the AMS.

In the HO execution procedure, the AMS performs a procedure for network re-entry to a target ABS (T-ABS or TBS). Here, it is possible to perform network re-entry through CDMA ranging or directly using a ranging request (AAI RNG-REQ) message. When the AMS performs Entry Before Brake (EBB), the AMS performs a procedure for network re-entry to the T-ABS in an unavailable interval (UAI) while constantly communicating information to the S-ABS in a predetermined available interval (AI). When the AMS performs Break Before Entry (BBE) handover, the AI or UAI are not determined and the same procedure as a hard handover procedure of a general IEEE 802.16e network is performed.

The handover procedure is described below in more detail with reference to FIG. 2.

Figure 2:
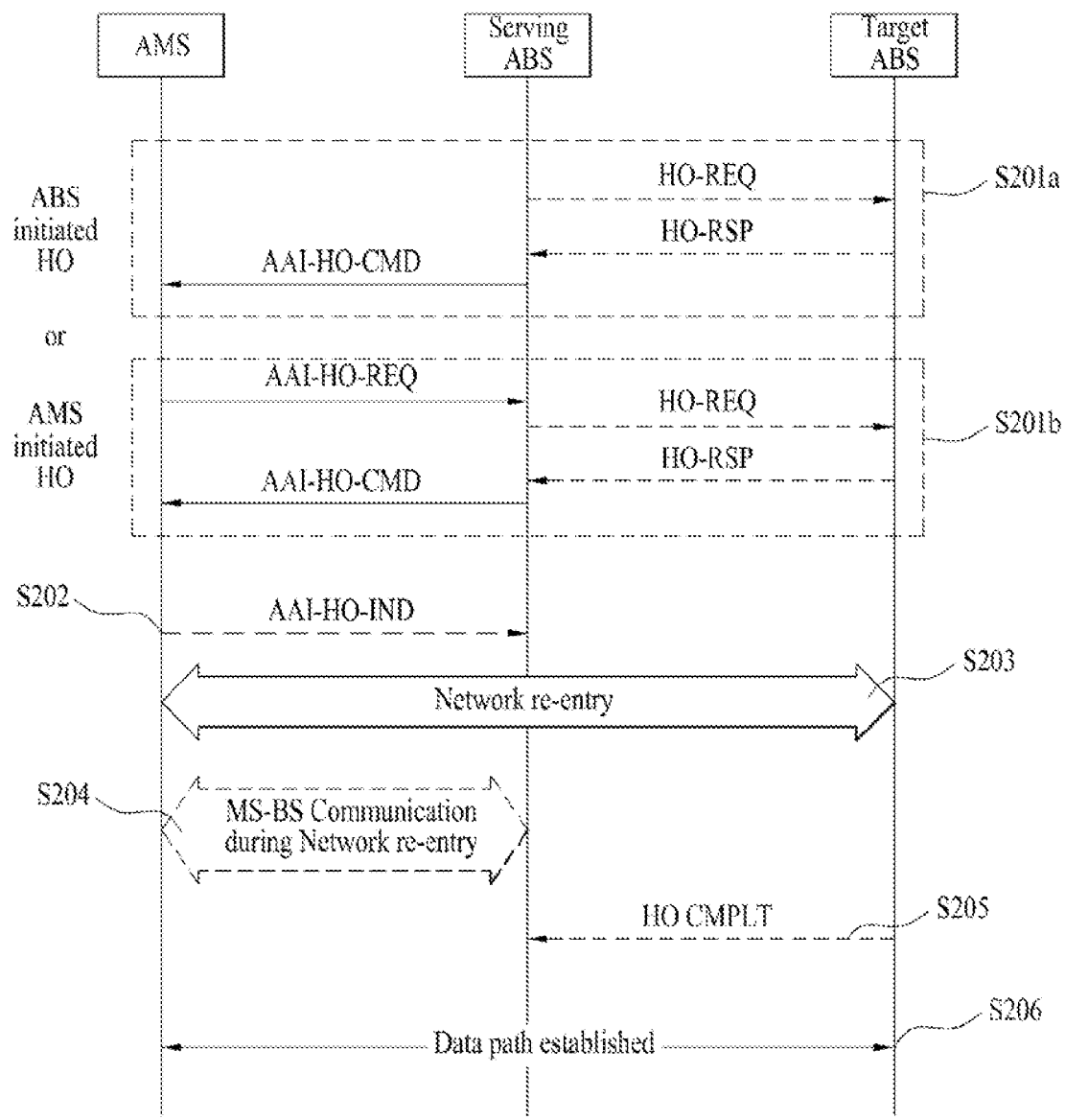
FIG. 2 illustrates an exemplary handover procedure in a general IEEE 802.16m system which may be applied to the present invention.

FIG. 2 illustrates an exemplary handover procedure in a general IEEE 802.16m system.

As shown in FIG. 2, the handover procedure may be initiated by an S-ABS (S201a) and may also be initiated by an AMS (S201b). In the case in which the AMS initiates the handover procedure, the AMS needs to perform a procedure for transmitting a handover request (AAI_HO-REQ) message in order to request handover from the S-ABS. However, the S-ABS may initiate the handover procedure without receiving the message from the AMS.

When the AMS receives a handover command (AAI_HO-CMD) message from the S-ABS, the AMS may selectively transmit a handover indication or instruction (AAI_HO-IND) message to the S-ABS (S202). The AMS transmits a handover indication message to the S-ABS under the following conditions:

1) when the AMS desires to cancel handover based on conditions set by the S-ABS, 2) when a plurality of candidate T-ABSs is included in the AAI_HO-CMD message and the AMS has selected one of the plurality of T-ABSs, 3) when it is not possible to access all candidate T-ABSs included in the AAI_HO-CMD message, or 4) when it is not possible to maintain connection with the S-ABS before the disconnect time is reached.

Thereafter, the AMS performs network reentry to the T-ABS (S203).

In the case in which there is a process scheduled by S-ABS before the disconnect time is reached or EBB handover is performed, the AMS may exchange data with the S-ABS while the AMS is performing the network re-entry procedure (S204).

When network re-entry is completed, the T-ABS may notify the S-ABS of handover termination (S205) and the AMS may normally exchange data with the T-ABS (S206).

In the handover procedure described above, the AMS may initiate the handover procedure by transmitting a handover request (AAI_HO-REQ) message to the S-ABS and the S-ABS may instruct the AMS to perform handover by transmitting a handover command (AAI_HO-CMD) message to the AMS. Here, there may be a problem in the handover procedure when the AMS or the ABS has not successfully transmitted or received a handover-related MAC management message.

For example, in the case in which the AMS initiates handover, a handover procedure is initiated through transmission of an AAI_HO-REQ message and handover is performed in earnest upon receiving an AAI_HO-CMD message from the S-ABS. Here, when the AAI_HO-CMD message is lost such that the AMS fails to receive an AAI_HO-CMD message, the ABS may retransmit the AAI_HO-CMD message or the AMS may retransmit an AAI_HO-REQ message, which guarantees reliability of the handover procedure, enabling normal handover.

For an AMS that complies with a handover procedure defined in the IEEE 802.16m system, there is a need to prevent frequent handover when ABSs such as femto cells, pico cells, or relay stations whose coverage is relatively small (which are hereinafter referred to as "small cells" for ease of explanation) are present in the coverage of the macro AMS as described above.

To meet the need, the present invention provides 1) a method for correcting scanning results depending on the type of a neighbor ABS in a process of scanning neighbor ABSs as one process in a handover preparation procedure and 2) a method of using a timer in a handover trigger process.

In the following description, it is assumed that a T-ABS which is a target of scanning or handover is a femto ABS (FBS) which is present in an overlay manner in the coverage of the macro ABS. The FBS, which is a small version of the macro ABS, is a type of ABS that may perform most functions of the macro ABS and may be installed in an area covered by the macro ABS or in a blind zone which is not covered by the macro ABS. The FBS has an independently operating network configuration and a significantly larger number of FBSs than relay ABSs may be installed in downtown or indoor areas. In addition, no matter whether the FBS is a type of Open Subscriber Group (OSG) or a type of Closed Subscriber Group (CSG), it is assumed that there are no handover limitations due to the subscriber group since the AMS is a CSG member. Of course, the assumption that the target ABS is an FBS is exemplary and the present invention is not limited thereto and may be applied to various small cells such as a pico cell, a micro cell, or a relay station.

1) Correction of Results of Scanning Procedure

The following is a method for preventing unnecessary handover in a scanning procedure according to an embodiment of the present invention. In order to prevent unnecessary handover in the scanning procedure, this embodiment suggests that the AMS correct (normalize or average) a result of scanning of a target ABS according to the type of the target ABS. That is, in order to reduce unnecessary handover to ABSs which are of a small cell type, correction may be performed so as to give predetermined penalty to a scanning result of a small cell. The corrected scanning results may be used to determine whether or not a handover trigger condition for the AMS and/or the S-ABS is satisfied.

Here, a correction value that is applied to correct the scanning result of a small cell may be predetermined or an ABS may signal the correction value to an AMS through a scan response message (AAI-SCN-RSP) or the like. In addition, the correction value may be defined in a T-ABS or TBS-specific manner and the scanning result to which the correction value has been applied may be used to determine whether or not a handover trigger condition is satisfied.

The correction may be referred to as a "TBS-specific trigger correction value" or "TBS type specific trigger averaging value".

The above procedure is described below with reference to FIG. 3.

Figure 3:
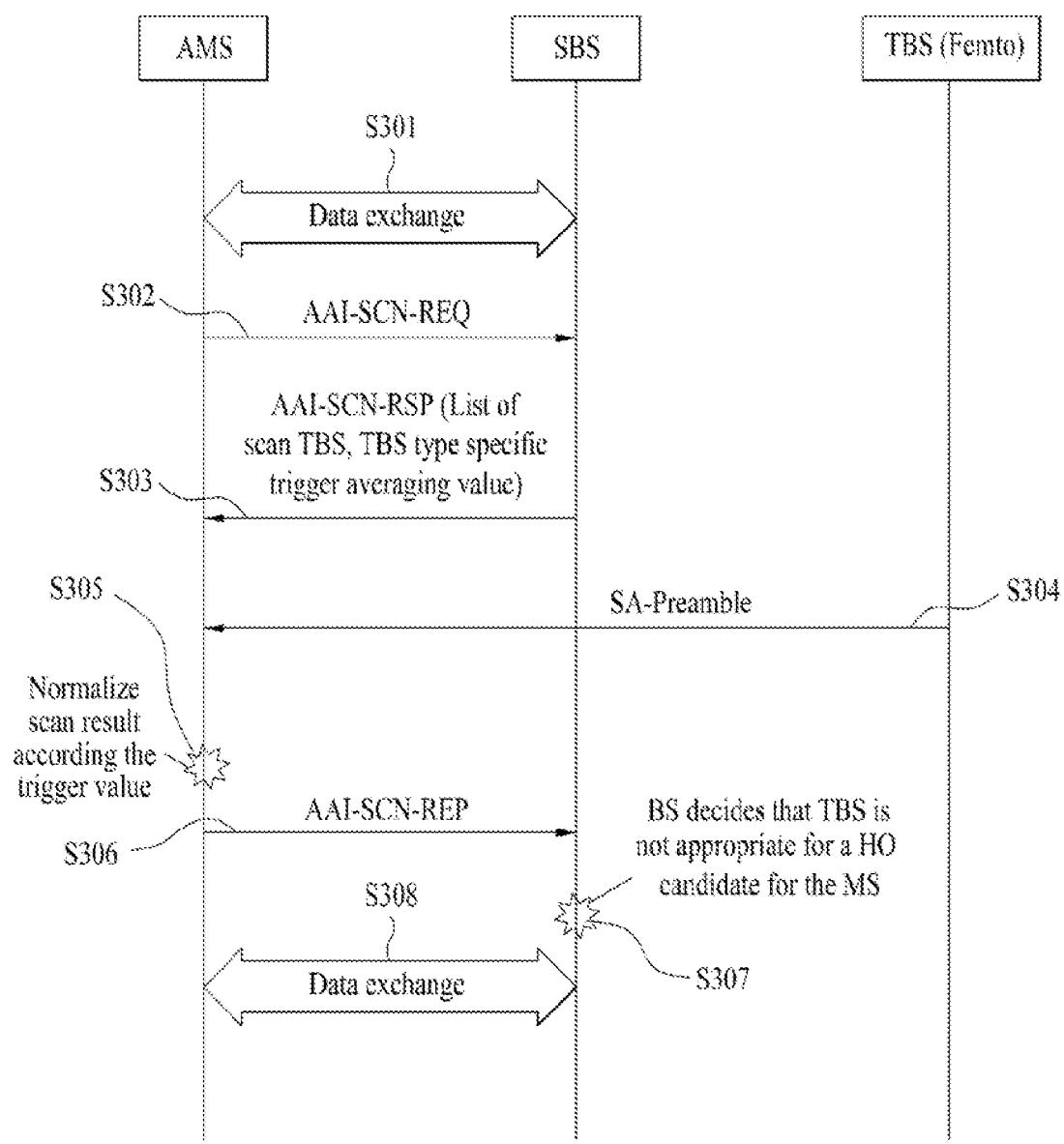
FIG. 3 illustrates an exemplary method for determining whether or not to perform handover to a target ABS (T-ABS) in a scanning procedure according to an embodiment of the present invention.

FIG. 3 illustrates an exemplary method for determining whether or not to perform handover to a T-ABS in a scanning procedure according to an embodiment of the present invention.

In the example of FIG. 3, it is assumed that the S-ABS is a macro ABS and the T-ABS is a femto ABS arranged in the coverage of the S-ABS. It is also assumed that a correction value, which is applied to a result of scanning according to the type of the ABS, is signaled from the S-ABS to the AMS through a scan response message.

While the AMS is normally exchanging data with the S-ABS (S301), the AMS transmits a scan request message (AAI-SCN-REQ) to the S-ABS according to a predetermined scanning trigger condition (S302).

The AMS may receive scanning related information such as a scan interval by receiving a scan response message (AAI-SCN-RSP) from the S-ABS as a response to the scan request message (S303).

More specifically, the scan response message may include information regarding a correction value (TBS type specific trigger averaging value) which is to be applied according to the type of the T-ABS according to this embodiment in addition to information such as a scan interval and a list of scan target ABSs (scan TBSs) which are generally included in the scan response message.

Of course, the scan response message may be transmitted from the S-ABS as an unsolicited response (AAI-SCN-RSP) without the AMS's transmission of a scan request message.

Thereafter, the AMS may perform scanning on a T-ABS according to scan interval information included in the scan response message. Here, the term "to perform scanning" may mean that the AMS receives an SA-preamble (S304).

Here, the SA-preamble stands for a secondary advanced preamble which may include information such as a cell ID and an ABS type. The AMS may determine the ABS type of the T-ABS through ABS type information of the SA-preamble received from the T-ABS or a neighbor advertisement message (AAI-NBR-ADV) broadcast by the S-ABS.

The AMS applies a correction value acquired through the scan response message to the result of scanning that has been performed on the T-ABS (S305). Specifically, since the T-ABS is a femto ABS as assumed above, the AMS applies a correction value corresponding to the type of the femto ABS among correction values (TBS type specific trigger averaging values) acquired from the ABS.

The corrected scanning result is transmitted to the S-ABS through a scan response message (AAI-SCN-REP) (S306).

The S-ABS may determine whether or not the T-ABS is suitable for handover using the corrected scanning result and does not perform handover triggering upon determining that the T-ABS is not suitable for handover (S307).

The AMS may also determine whether or not to trigger handover according to the corrected scanning result and keeps exchanging data with the S-ABS without triggering handover upon determining that the T-ABS is not suitable for handover (i.e., upon determining that a signal quality level or the like according to the corrected scanning result does not exceed a threshold for handover triggering) (S308).

Of course, even when the scanning result is corrected such that penalty is given to the scanning result since the T-ABS is a femto ABS, handover to the T-ABS may be performed if the condition for handover triggering is satisfied (not shown).

As a result, if the macro ABS notifies the AMS of a correction value appropriate for the deployment of small cells in the coverage of the macro ABS, it is possible to reduce unnecessary handover of the AMS to small cells.

2) Application of Timer to Handover Triggering Procedure

The following is a description of a method for preventing unnecessary handover in a handover triggering procedure according to another embodiment of the present invention. To prevent unnecessary handover in the handover triggering procedure, this embodiment suggests that the AMS start a timer instead of transmitting a handover request message (AAI-HO-REQ) to the S-ABS when a handover triggering condition for the T-ABS is satisfied. In addition, this embodiment suggests that, when the timer expires, the AMS determine whether or not it is possible to communicate with the T-ABS (i.e., whether or not the T-ABS is reachable) and, after the timer expires, the AMS initiate handover (i.e., transmit a handover request message) only when it is possible to communicate with the T-ABS.

Since applying the above procedure to the macro ABS may cause unnecessary delay, it is preferable that the above procedure be applied only when the T-ABS is a small cell. That is, if the T-ABS is the macro ABS, the AMS initiates a handover procedure when a handover triggering condition is satisfied as a general handover procedure is performed and, if the T-ABS is a small cell such as a femto ABS, the AMS starts the timer. In the following description, the timer is referred to as an "HO execution timer" for the sake of convenience.

The HO execution timer may be transmitted from the S-ABS to the AMS through a unicast message such as a scan response message or may be transmitted to the AMS through broadcast information such as a superframe header (SFH). Of course, the HO execution timer may be a value predetermined by the system.

The above procedure is described below with reference to FIG. 4.

Figure 4:
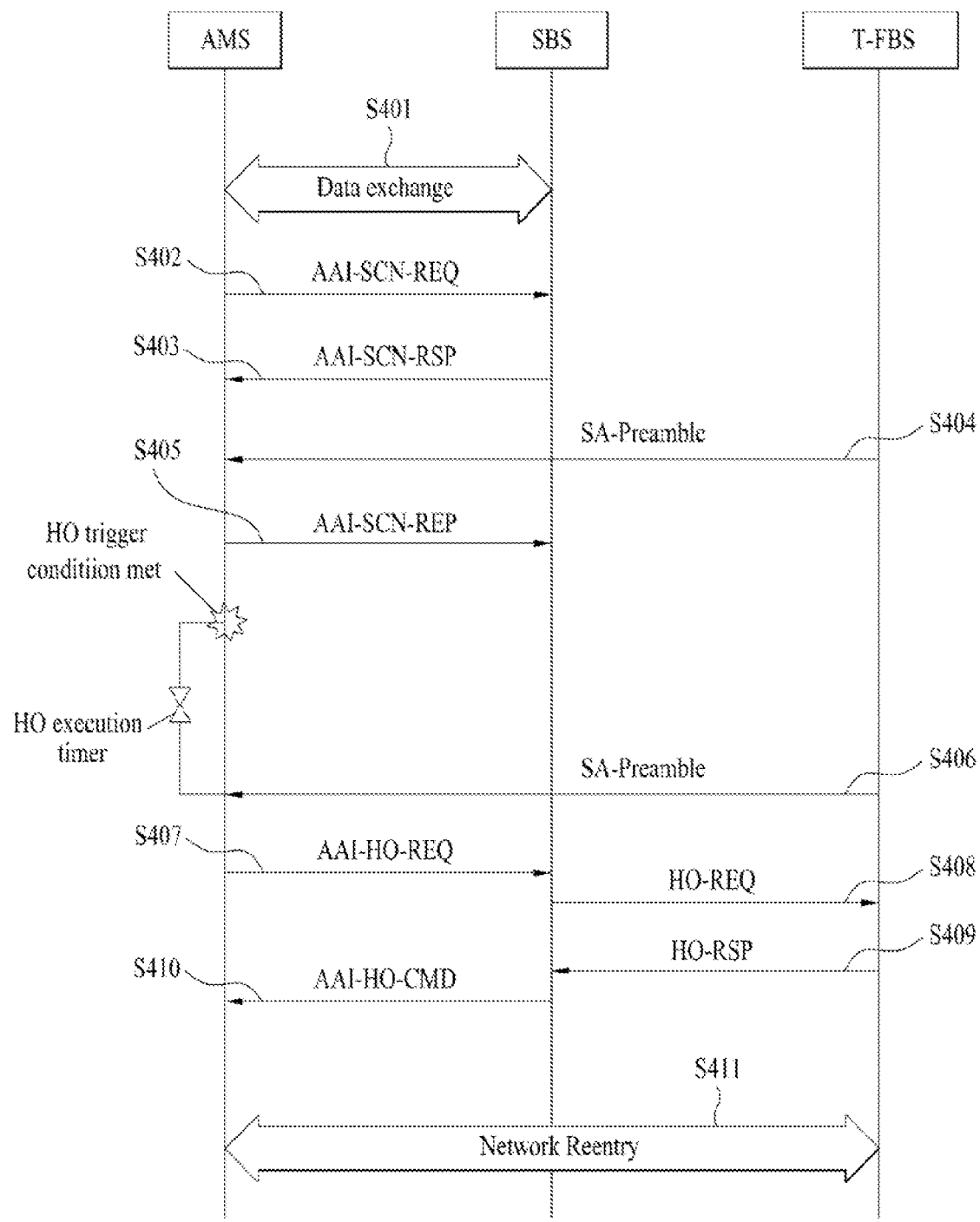
FIG. 4 illustrates an exemplary method for determining whether or not to perform handover to a T-ABS in a scanning procedure according to another embodiment of the present invention.

FIG. 4 illustrates an exemplary method for determining whether or not to perform handover to a T-ABS in a scanning procedure according to another embodiment of the present invention.

In the example of FIG. 4, it is assumed that the S-ABS is a macro ABS and the T-ABS (TBS) is a femto ABS arranged in the coverage of the S-ABS.

While the AMS is normally exchanging data with the S-ABS (S401), the AMS transmits a scan request message (AAI-SCN-REQ) to the S-ABS according to a predetermined scanning trigger condition (S402).

The AMS may receive scanning related information such as scan interval information by receiving a scan response message (AAI-SCN-RSP) from the S-ABS as a response to the scan request message (S403).

Of course, the scan response message may be transmitted from the S-ABS as an unsolicited response (AAI-SCN-RSP) without the AMS's transmission of a scan request message.

Thereafter, the AMS may perform scanning on a T-ABS according to scan interval information included in the scan response message. Here, the term "to perform scanning" may mean that the AMS receives an SA-preamble (S404).

The AMS transmits a result of scanning that has been performed on the T-ABS to the S-ABS through a scan report message (AAI-SCN-REP) (S405).

Here, when the T-ABS is of a small cell type although the result of scanning of the T-ABS satisfies the handover triggering condition, the AMS starts the HO execution timer instead of transmitting a handover request message to the S-ABS. The AMS can determine the type of the T-ABS through an SA-preamble or a neighbor advertisement message (AAI-NBR-ADV) as described above.

Even after the HO execution timer expires, the AMS transmits a handover request message to the S-ABS (S407) if the T-ABS is reachable, for example, if an SA-preamble or a superframe header (SFH) is successfully received from the T-ABS (S406).

The procedure of steps S408 to S411 is similar to the procedure of S201a or S201b to S206 of FIG. 2 and therefore a redundant description thereof is omitted herein for clarity of explanation. That is, in the remaining steps, the AMS may perform handover to the T-ABS according to the procedure defined in the general IEEE 802.16m system.

The example of FIG. 4 has been described with reference to the case in which the T-ABS is reachable even after the HO execution timer expires. The case in which the T-ABS is unreachable after the HO execution timer expires is described below with reference to FIG. 5.

Figure 5:
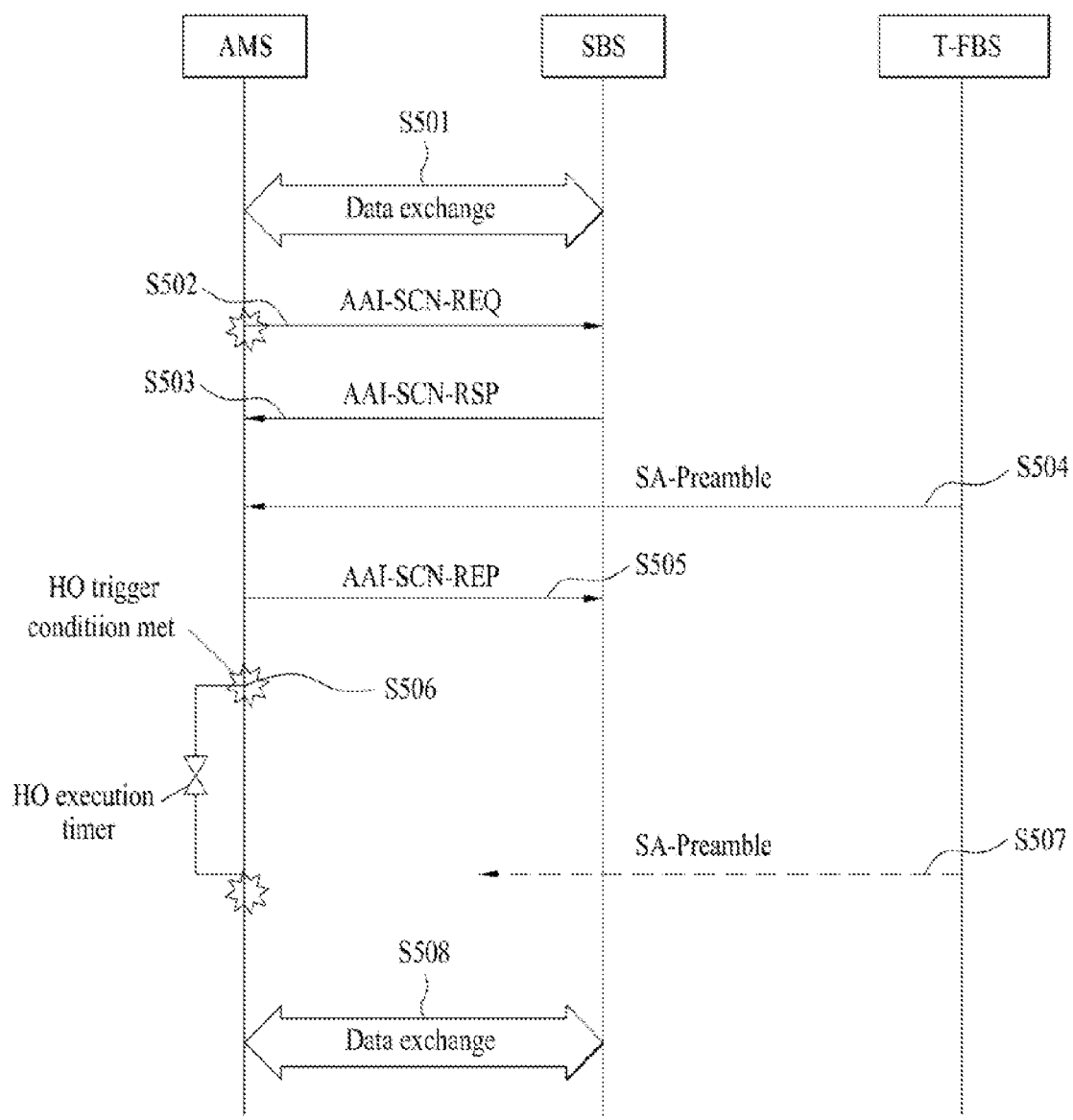
FIG. 5 illustrates another exemplary method for determining whether or not to perform handover to a T-ABS in a scanning procedure according to another embodiment of the present invention.

FIG. 5 illustrates another exemplary method for determining whether or not to perform handover to a T-ABS in a scanning procedure according to another embodiment of the present invention.

The same assumptions as those of FIG. 4 are applied to the example of FIG. 5.

The procedure of steps S501 to S504 is similar to the procedure of S401 to S404 of FIG. 4 and therefore a redundant description thereof is omitted herein for clarity of explanation.

The AMS transmits a result of scanning that has been performed on the T-ABS to the S-ABS through a scan report message (AAI-SCN-REP) (S505).

Here, if the T-ABS is of a small cell type although the result of scanning of the T-ABS satisfies the handover triggering condition, the AMS starts the HO execution timer instead of transmitting a handover request message to the S-ABS (S506).

When the HO execution timer expires, the AMS attempts to receive an SA-preamble or a superframe header (SFH) from the T-ABS in order to determine whether or not the T-ABS is still reachable. Here, if the AMS fails to communicate with the T-ABS (i.e., if the TBS is unreachable) (S507), the AMS may cancel triggering of handover to the T-ABS and maintain normal communication with the S-ABS (S508).

As a result, if the macro ABS notifies the AMS of an HO execution timer value appropriate for the deployment of small cells in the coverage of the macro ABS or such an appropriate HO execution timer value is predetermined, it is possible to reduce unnecessary handover of the AMS to small cells. The method according to this embodiment may be useful especially for a high-mobility AMS (i.e., when the AMS is moving at a high speed) since it is possible to prevent handover to a small cell by which the AMS will pass in a short time.

AMS and ABS Structure

An AMS and an ABS (FBS or MBS) according to another embodiment of the present invention in which the embodiments of the present invention can be performed are described below.

The AMS may operate as a transmitter in uplink and may operate as a receiver in downlink. The ABS may operate as a receiver in uplink and may operate as a transmitter in downlink. That is, each of the AMS and the ABS may include a transmitter and a receiver for information or data transmission.

The transmitter and the receiver may include a processor, a module, a portion, and/or a means for performing the embodiments of the present invention. Specifically, each of the transmitter and the receiver may include a module (means) for encrypting a message, a module for parsing an encrypted message, an antenna for transmitting and receiving a message, and the like. An example of such transmitting and receiving ends is described below with reference to FIG. 6.

Figure 6:
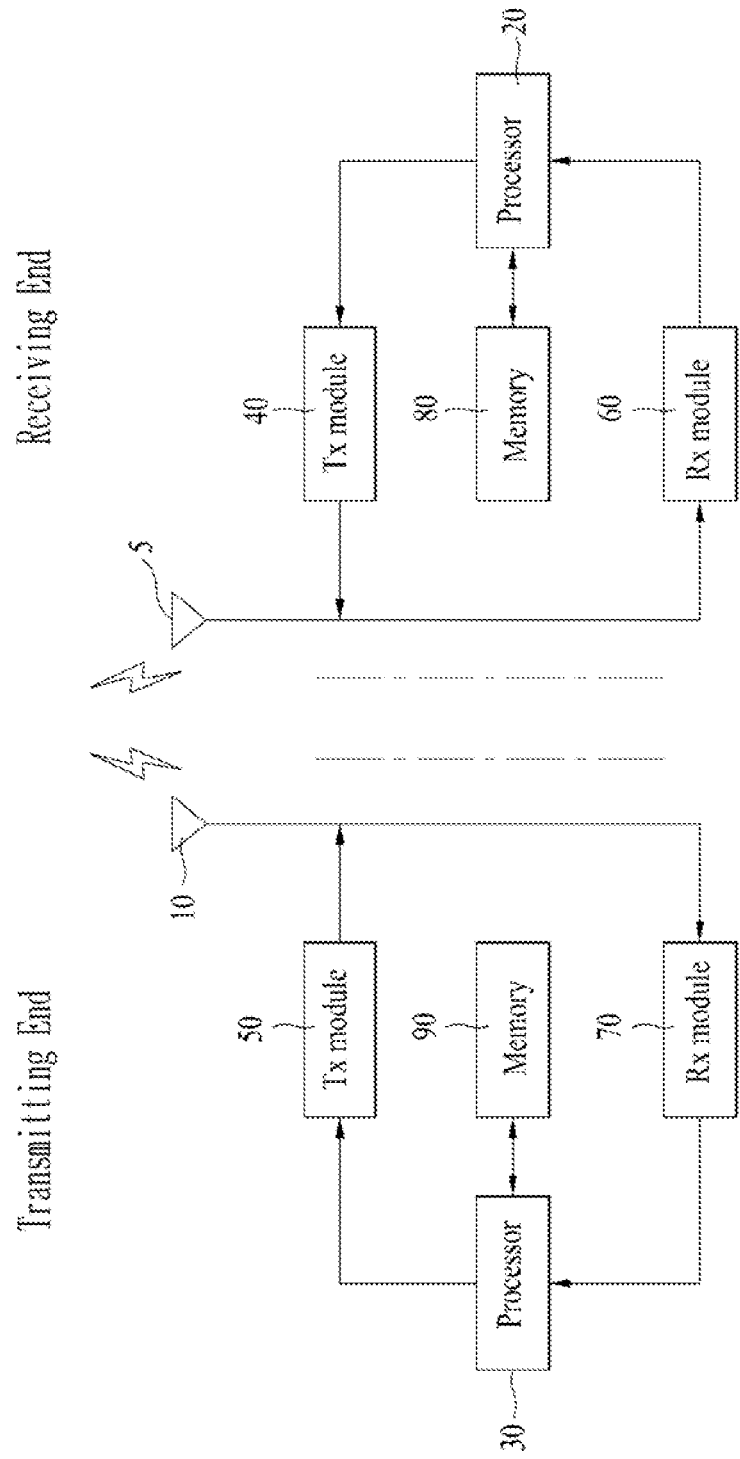
FIG. 6 is a block diagram illustrating exemplary structures of a transmitting end and a receiving end according to another embodiment of the present invention.

FIG. 6 is a block diagram illustrating exemplary structures of the transmitting end and the receiving end according to another embodiment of the present invention.

A left part of FIG. 6 illustrates the structure of the transmitting end and a right part of FIG. 6 illustrates the structure of the receiving end. The transmitting and receiving ends may include antennas 5 and 10, processors 20 and 30, transmission modules (Tx modules) 40 and 50, reception modules (Rx modules) 60 and 70, and memories 80 and 90, respectively. Each pair of components may perform a corresponding function. The following is a detailed description of each of the components.

The antennas 5 and 10 may function to transmit signals generated by the transmission modules 40 and 50 to the outside and to receive wireless signals from the outside and deliver the wireless signals to the reception modules 60 and 70. Each of the transmitting and receiving ends may include two or more antennas when a multiple antenna (MIMO) scheme is supported.

In each of the transmitting and receiving ends, the antenna, the transmission module, and the reception module may constitute a Radio Frequency (RF) module.

The processors 20 and 30 generally control overall operations of the AMS and the ABS, respectively. Specifically, each of the processors 920 and 930 may perform a control function for performing the embodiments of the present invention described above, a function to perform MAC frame variable control according to service characteristics and radio environments, a handover function, authentication and encryption functions, and the like.

More specifically, the processors 20 and 30 may perform overall control for performing the handover procedures illustrated in FIGS. 3 to 5.

Especially, the processor of the AMS may determine whether or not a handover triggering condition is satisfied by applying a different weight to each type of T-ABS in the scanning procedure. Alternatively, when the handover triggering condition is satisfied, the processor of the AMS may control the AMS to initiate the HO execution timer if the T-ABS is a small-cell ABS and to initiate handover to the T-ABS if the T-ABS is reachable even after the timer expires.

The processor of the AMS may also perform overall control of the operating procedures described in the above embodiments.

The transmission modules 40 and 50 may perform coding and modulation of data, which has been scheduled by the processors to be transmitted to the outside, and then may deliver the resulting data to the antennas 5 and 10, respectively.

The reception modules 60 and 70 may perform decoding and demodulation upon radio signals received from the outside through the antennas 5 and 10 to restore the radio signals into original data and then may deliver the original data to the processors 20 and 30, respectively.

The memories 80 and 90 may store programs for processing and control by the processors and may also temporarily store input/output data items. The memories 80 and 90 may include a storage medium of at least one of a flash memory type, a hard disk type, a multimedia card micro type, a card type (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The ABS may perform, through at least one of the modules described above, a control function for performing the embodiments of the present invention described above, Orthogonal Frequency Division Multiple Access (OFDMA) packet scheduling, Time Division Duplex (TDD) packet scheduling, and channel multiplexing functions, a function to perform MAC frame variable control according to service characteristics and radio environments, a high-speed traffic real-time control function, a handover function, authentication and encryption functions, a function to perform modulation/demodulation for data transmission, a high-speed packet channel coding function, a real-time modem control function, and the like or may further include means, modules, or portions for performing these functions.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. In addition, claims which are not explicitly dependent on each other can be combined to provide an embodiment or new claims can be added through amendment after this application is filed.

[Industrial Applicability]

Although a method for performing more efficient ranging and an AMS structure for the same in a broadband wireless access system have been described with reference to an example in which the method and the MS structure are applied to an IEEE 802.16m system, the method and the MS structure may not only be applied to IEEE802.xx systems but may also be applied to various other mobile communication systems such as 3GPP/3GPP2 systems.

The invention claimed is:

1. A method for performing handover in a broadband wireless access system, the method performed by a mobile station and comprising:
   determining a type of a target base station which satisfies a preset handover triggering condition;
   performing a handover procedure for handing over to the target base station when the target base station is a first type of base station and starting a first timer when the target base station is a second type of base station whose coverage is smaller than a coverage of the first type of base station; and
   when the first timer is started, determining whether or not it is possible to communicate with the target base station after the first timer expires.

2. The method according to claim 1, further comprising:
   performing the handover procedure for handing over to the target base station upon determining that it is possible to communicate with the target base station after the first timer expires.

3. The method according to claim 1, wherein determining whether or not it is possible to communicate with the target base station includes receiving a secondary advanced preamble (SA-preamble) of the target base station.

4. The method according to claim 1, wherein the first type of base station includes a macro base station and the second type of base station includes a pico-cell base station, a femto-cell base station, and a relay station.

5. A method for performing handover in a broadband wireless access system, the method performed by a mobile station and comprising:
   scanning a target base station;
   applying a weight according to a type of the target base station to a result of the scanning,
   wherein the weight is an averaging value for a signal quality level; and
   determining whether or not a handover triggering condition is satisfied using the scanning result to which the weight has been applied,
   wherein the weight according to the type is received from a serving base station through a scan response (AAI-SCN-RSP) message.

6. The method according to claim 5, further comprising transmitting the scanning result to which the weight has been applied to a serving base station through a scan report (AAI-SCN-REP) message.

7. The method according to claim 5, wherein the type is determined according to a size of coverage of each base station.

8. A method for a serving base station to support handover of a mobile station in a broadband wireless access system, wherein the mobile station scans a target base station, the mobile station applies a weight according to a type of the target base station to a result of the scanning, the weight being an averaging value for a signal quality level, the mobile station determines whether or not a handover triggering condition is satisfied using the scanning result to which the weight has been applied, the method performed by the base station and comprising:
   transmitting to the mobile station, a scan response (AAI-SCN-RSP) message including the weight;
   receiving, from the mobile station, a scan report (AAI-SCN-REP) message including the scanning result to which the weight has been applied; and
   determining whether or not a handover triggering condition is satisfied using the scanning result to which the weight has been applied.

9. The method according to claim 8, wherein the type is determined according to a size of coverage of each base station.

10. A mobile station that operates in a broadband wireless access system, the mobile station comprising:
    a processor; and
    a Radio Frequency (RF) module for externally transmitting and receiving a wireless signal under control of the processor,
    wherein the processor performs control operations for
       determining a type of a target base station which satisfies a preset handover triggering condition,
       performing a handover procedure for handing over to the target base station when the target base station is a first type of base station, starting a first timer when the target base station is a second type of base station whose coverage is smaller than that a coverage of the first type of base station, and when the first timer is started, determining whether or not it is possible to communicate with the target base station after the first timer expires.

11. The mobile station according to claim 10, wherein the processor performs a control operation for performing the handover procedure for handing over to the target base station upon determining that it is possible to communicate with the target base station after the first timer expires.

12. The mobile station according to claim 10, wherein the processor determines that it is possible to communicate with the target base station if a secondary advanced preamble (SA-preamble) of the target base station is successfully received.

13. The mobile station according to claim 10, wherein the first type of base station includes a macro base station and the second type of base station includes a pico-cell base station, a femto-cell base station, and a relay station.

14. A mobile station that operates in a broadband wireless access system, the mobile station comprising:

a processor, and a Radio Frequency (RF) module for externally transmitting and receiving a wirless signal under control of the processor, wherein the processor is configured to:
scan a target base station,
apply a weight according to a type of the target base station to a result of the scanning,
wherein the weight is an averaging value for a signal quality level, and
determine whether or not a handover triggering condition is satisfied using the scanning result to which the weight has been applied,
wherein the weight according to the type is received from a serving base station through a scan response (AAI-SCN-RSP) message.

15. The mobile station according to claim 14, wherein the processor is configured to transmit a scan report (AAI-SCN-REP) message including the scanning result to which the weight has been applied to a serving base station.

16. The mobile station according to claim 14, wherein the type is determined according to a size of coverage of each base station.

* * * * *